United States Patent Office 3,442,683
Patented May 6, 1969

3,442,683
PRODUCTION OF METALLIC COATINGS UPON THE SURFACES OF OTHER MATERIALS

Jean P. Lenoble, Southampton, John Addy, Chandlers Ford, and Bruce P. Piggin, Winchester, England, assignors to International Business Machines Corporation, Armonk, N.Y., a corporation of New York No Drawing. Filed May 13, 1965, Ser. No. 455,650
Claims priority, application Great Britain, June 15, 1964, 24,742/64
Int. Cl. C23c *3/00;* B44d *1/18, 1/092*
U.S. Cl. 117—47 2 Claims

ABSTRACT OF THE DISCLOSURE

The surface of a non-metallic article is metallized by contacting that surface with a solution containing both a solvent liquid capable of attacking and eating away the surface and a seeding metal compound to condition the surface; and, contacting the conditioned surface with a solution of a metal salt to cause the chemical deposition of the metal from the salt solution onto the conditioned surface.

This invention is concerned with improvement in or relating to the production of metallic coatings upon the surface of other materials. It relates particularly, though not exclusively, to the preparation of electrically-conductive or semi-conductive and/or magnetic coatings upon the surface of nonconductive substrates, and is mainly directed to the preparation of so-called printed wiring.

The problem of preparing a metallic coating upon the surface of some other material is widely encountered and is well illustrated in connection with printed wiring where it is necessary to produce an electrically-conductive metallic coating which adheres strongly to the surface of an underlying nonconductive substrate. At the present time this metallic surface coating is usually formed by deposition of metal onto the substrate surface from the vapour phase, since this technique yields a metallic coating which adheres strongly to the surface of the substrate, but since vapour deposition can be carried out only under vacuum conditions and takes place at best only slowly this technique clearly cannot be regarded as always satisfactory.

It is already known that coatings of a variety of metals can be produced on the surface of various substrates by first chemically seeding the surface of the substrate with stannous chloride and/or palladium chloride and thereafter treating the resultant seeded surface with a solution of a salt of the metal which is to form the final coating. The final coating metal is in this way chemically deposited upon the seeded substrate surface and, to a certain limited extent, adheres to it. The adherence of this chemically deposited layer is however much less than that of a vapour-deposited layer, and is inadequate for many purposes, especially for instance for use in printed wiring where it is vital that the conductors should possess a high and lasting adherence to the non-conductive substrate. It can be speculated that the relatively low adhesion of these known chemically deposited metallic coatings is due to the formation of only or mainly a physical bond between the coating and the substrate. Whether this is true or not, it certainly can be said that, in view of the difficulties and expense of vapour deposition, it would be advantageous to adopt the technique of chemically depositing metal onto a seeded substrate even in the preparation of printed wiring if only the adhesion of the deposited coating to the substrate could be raised to a value comparable with that of vapour deposited coatings.

In an attempt to enhance the adhesion of the chemically deposited coating it has already been suggested that the surface of the substrate should be roughened before seeding. One particular procedure involves first roughening the surface, either by physical abrasion or chemical etching, so as to expose a fresh surface upon the substrate, then treating the roughened surface with a solution containing stannous chloride, and/or palladium chloride, thereafter contacting the treated surface with a second solution containing a reducing agent, and finally subjecting the surface thus seeded to electroless metallic plating with a third solution of a metal salt and a suitable reducing agent. While certainly this procedure does enhance the physical bond created between the subsequently deposited metal coating and the surface, the degree of improvement in the adhesion of the coating to the surface falls far short of what is needed to make it comparable with that obtained by vapour deposition.

We have now found that a quite unexpected increase in the adhesion of a chemically deposited metallic coating to the underlying substrate surface can be achieved by preconditioning the surface by attacking it with a solvent liquid containing the chemical seed and thereafter chemically depositing metal upon the surface thus preconditioned. This new procedure is applicable quite generally to the deposition of many different metallic coatings on a wide variety of substrates, and when performed in the manner hereinafter recommended gives results comparable with or even superior to those attainable by vapour deposition. While we do not wish to be limited by theoretical considerations, it is likely that the great increase in the adhesive forces between the deposited metallic coating and the substrate brought about by our new procedure can be attributed to the creation between them of true chemical bonds instead of or in addition to a mere physical bond.

According to the present invention there is therefore provided a process for the production of metallic electrically conductive or semi-conductive, and/or magnetic coatings upon the surfaces of other materials, in which a non-metallic substrate surface is subjected to a preconditioning attack by solvent liquid (as hereinafter defined) for said substrate which contains dissolved therein at least a detectable concentration of one or more suitable seeding metal compounds, the surface thus preconditioned being thereafter metallized at least initially by chemical deposition.

The term "solvent liquid" is used herein to embrace any liquid medium which is capable of attacking and eating away the surface of the substrate, no matter whether the attack upon the surface takes place merely by physical dissolution or by chemical etching thereof. It is also to be understood that the term "seeding metal compound" as used herein covers any compound notionally derived, either directly or indirectly, by reacting that metal with an oxidizing agent, such as an acid, provided only that the compound in question is soluble in the chosen solvent liquid. Any such seeding metal compound will however serve so long as it is soluble to the minimal extent needed to render its presence detectable, presumably because it can be supposed to act catalytically and/or to be adsorbed or absorbed at the nascent interface created by the attack of the solvent liquid upon the solid substrate.

The non-metallic substrates to which the process of this invention is applicable are of the most diverse kinds, including not only glass, synthetic resins, natural polymeric material, ceramics and so on, but also even wood, usually, of course, in the form of paper or processed into regenerated cellulose products. Indeed the choice of substrate seems unlimited, provided only that a solvent liquid suitable for any given substrate can be found. The nature of the substrate employed in any case will, of course, be determined by the use to which the finished article will later be put. This invention, is, however, particularly useful on surfaces which are relatively chemically inert. While there are many metals suitable for use as seeding agents, we prefer to use compounds of tin, and particularly stannous compounds. In particular, stannous chloride is preferred for use as a seeding compound.

Equally, the metallic coating formed on the surface of the non-metallic substrate can be of the most diverse kinds. In principle any soluble metal compound, soluble organic compound, or soluble non-metallic compound or any combination of the three which can chemically reduce another metal compound to the latter's parent metal and can be oxidized to a water-soluble compound would be suitable for this process. For most practical purposes it is, however, found greatly preferable first chemically to deposit a thin trace of palladium ions upon the preconditioned surface, and thereafter to develop this initial palladium trace deposit by building up a second layer usually of another metal thereupon, this second layer constituting the main body of the metallization.

It should also be noted, that in certain cases it is advantageous to develop and strengthen the seed sites by a further application of a solution of the seeding metal compound, though without the use of the solvent employed in the preconditioning reaction.

As has already been disclosed, the process of this invention can be applied to a wide variation of substrates, solvents, and so on. Particular systems which are useful are: polyesterterephthalate resins/concentrated sulphuric acid; polyesterterephthalate resins/trichloroacetic acid; polyvinylchloride resins/acetone and glasses/hydrofluoric acid.

While within limits it is feasible after preconditioning the surface to defer the palladium ion deposition until later, it is nevertheless, a distinctly preferred feature of the invention that to reduce danger of the preconditioned surface becoming impaired during storage the preconditioning of the surface should be followed without avoidable delay by deposition thereupon of at least an initial trace deposit of palladium. It is however, to be borne in mind that impairment of the preconditioning surface must be avoided not only during possible storage but also during deposition of palladium ions or indeed any other metal ions, as will be more fully explained subsequently.

The chemical deposition of the initial thin trace layer of palladium may most conveniently be carried out by successively treating the preconditioned surface first with a solution of a reducible palladium salt and thereafter with a reducing agent so as to form upon the surface nuclei of metallic palladium.

The process of the invention is applicable to production of corrosion resistant coatings, magnetic layers on tape for use in machines employing magnetic tape, such as computers, or for electrical or magnetic shielding of delicate apparatus. It may even be used for the preparation of metallic coatings which are intended merely for decorative effect, and thus for instance can be used to decorate ceramic, glass and other objects with any metal of attractive appearance, but as already indicated the prime value of the process lies in the preparation of printed wiring. For that purpose the main body of the ultimately deposited metal should be highly electrically conductive, and will therefore desirably be gold, silver, chromium, iron, nickel or copper, the two last-named being preferred since they are not only the most economically acceptable but also technically easy to deposit either by chemical or by electrolytic methods. With printed wiring the substrate may vary, but must be electrically non-conductive and for instance can include paper, resin-coated paper and glass. Above all, current practice demands that the substrate of a printed circuit should be a synthetic resin, and preferably a dimensionally stable synthetic resin, particularly polyesterterephthalate synthetic resins such as those available commerically as "Mylar" (registered trademark) and "Melinex" (registered trademark) resins.

Indeed, the process of the present invention has most particularly been developed in order to make it possible by chemical deposition of metal from the liquid phase to secure a satisfactory electrically-conductive copper, nickel or like coating with good adhesion to an underlying substrate of "Mylar" resin, and this is the preferred ultimate product.

However, if as preferred the preconditioned surface is first metallized by chemically depositing a thin trace of palladium thereupon, and it is then desired to form the main body of the metallic coating from another metal, probably copper or zinc, this must be done by building up a layer of the chosen metal or metals upon the palladinized surface by chemical and/or electrolytic deposition thereupon. This buildup of metal, which can be termed development of the palladinized surface, can within reasonable limits be deferred provided always that precautions are taken to preserve the palladinized surface from oxidation or other contamination, but it is a distinctly preferred feature of the invention that palladinization should be followed directly by chemical plating and/or electrolytic plating treatment. Naturally it will be understood that electrolytic treatment can be adopted at this stage only if palladinization in the preceding stage has been allowed to proceed until the trace has grown to form a continuous electrically-conductive film over the preconditioned surface. For this reason it is normally preferred, after palladinization to only a limited extent, to develop the palladium trace at first by chemical plating so as to form a continuous electrically-conductive film, and thereafter to build up the resultant conductive film to the desired ultimate thickness by an electroplating treatment.

It is to be understood that by chemical plating we refer to the deposition from an electroless chemical plating solution of a suitably electrically-conductive metallic material, which as previously indicated can for example include gold or silver but for economical reasons is most usually nickel or copper. Such electroless chemical plating solutions are in themselves well known, and need not be described in detail here. One suitable nickel plating solution contains a soluble nickel salt plus hypophosphite, while one suitable copper plating solution contains copper sulphate plus formaldehyde. Equally, the electrolytic solutions and methods employed for development of the surface are in themselves quite conventional and need no further description.

Now it is of course always to be understood that the surface after it has been preconditioned and during the course of development to build up the ultimate metallic coating, must be preserved against adverse effects which would impair it, of which chemical contamination is the most therefore likely to occur. To guard against such contamination it may be desirable between the various stages of the process to rinse the surface so as to avoid the risk of residues from a preceding stage being introduced into a subsequent stage.

Even so, it must be borne in mind that such rinsing can itself give rise to adverse effects upon the surface. Clearly the rinsing liquid, usually water, must not contain dissolved chemicals which will impair the surface. Less obviously, but probably of more importance, the rinsing must be carried out with a liquid which does not itself react with the substrate, nor with the last-applied surface deposit nor even with any residues of previously-employed liquid media. The latter point is of real significance in certain cases, and where necessary special care must be taken to avoid damage.

The process of the invention is intended for use mainly in the preparation of printed wiring in the form of copper, nickel or like conductive coatings upon a "Mylar" or "Melinex" substrate, and in the preconditioning stage of the process the solvent liquid employed to attack the surface of these polyesterterephthalate resins may be concentrated sulphuric acid, i.e. an aqueous solution containing at least 71% (by volume) and preferably 90% or more of $H_2SO_4$. A suitable metal seeding compound for use in an $H_2SO_4$ solvent is a tin salt, conveniently incorporated therein in the form of stannous chloride, and the solution advantageously also contains a relatively minor proportion of hydrochloric acid to assist in preserving the stannous chloride salt in solution. Whatever the precise composition of the solvent liquid, containing as it does a major proportion of sulphuric acid any residues left in or on the nascent surface created by the attack of the solvent liquid upon the original surface, will react with water or aqueous solutions when rinsed with these. If water or dilute aqueous solutions are used, the reaction, which is exothermic, can generate heat and expansive forces so violently as to alter the structure of the surface regions of the substrate fundamentally. Whether the preconditioning of the surface is thereby impaired is not known, but it is anyway irrelevant since the whole of the surface region is reduced to a white powdery layer which itself is inadherent and useless.

To avoid this difficulty it is possible to dilute the residues very slowly by successive rinsings with sulphuric acid solutions of increasing dilution, a final rinse with deionized water being performed only when the concentration of sulphuric acid in the last rinsing solution has fallen below 71% by volume.

The invention of course includes any article comprising a non-metallic substrate to which a metallic coating has been applied in accordance with the process herein described especially blanks to be used for the preparation of printed wiring, and printed wiring when thus prepared.

Such articles, when prepared in the recommended manner, can usually be relied upon to display an adhesion between the metallic coating and the substrate superior to anything hitherto achieved by chemical deposition from the liquid phase and which indeed is comparable to or even better than that attained by vapour deposition techniques.

In order that the invention may be well understood the following examples will now be given, though by way of illustration only to show details of preferred methods:

EXAMPLE I

Preparation of a copper coating on the surface of Melinex, using concentrated sulphuric acid solvent Stage A: Cleaning of Melinex surface.—A sample of Melinex in the form of a sheet is washed in an alkaline cleaning bath comprising:

| | | |
|---|---|---|
| Tetrasodium pyrophosphate | gms | 15–30 |
| Anionic detergent (Teepol 514) | cc | 5–10 |
| Non-ionic detergent (Nonidex A10) | cc | 5–10 |
| Sodium carbonate | cc | 5–10 |
| Water, to make 1 litre. | | |

The amount of sodium carbonate should be adjusted to make the pH of the solution 14. The Melinex sample is immersed in this cleaning solution for 5 minutes at room temperature with constant agitation, whereupon it is rinsed for 2–5 minutes in an overflow tank fed with de-ionized water. The Melinex at this stage is quite strongly hydrophobic, and will shed any water on it as it is removed from the rinsing tank.

Stage B: Preconditioning of Melinex surface.—The clean sample of Melinex is immersed with agitation for 5 minutes at room temperature in an etching and bonding solution comprising:

| | | |
|---|---|---|
| Sulphuric acid (conc.) | cc | 900 |
| Hydrochloric acid (conc.) | cc | 100 |
| Stannous chloride | gm | 0.5 |

Immediately after the above etching, the sample is rinsed for 15–20 minutes with agitation in a more dilute sulphuric acid solution comprising:

| | | |
|---|---|---|
| Sulphuric acid (conc.) | cc | 750 |
| Hydrochloric acid (conc.) | cc | 250 |

Whereafter the sample is rinsed in running de-ionized water for 5 minutes.

Though the Melinex sample is now seeded, and can be palladinized, we prefer to increase the strength of the seeding by a further stage C.

Stage C: Further seeding of tin.—The Melinex sample treated as in the preceding stages is immersed with gentle agitation for 5 minutes in a sensitizing solution comprising:

| | | |
|---|---|---|
| Hydrochloric acid (conc.) | cc | 100 |
| Stannous chloride | gm | 30 |
| Water, to make 1 litre. | | |

and thereafter rinsed in running de-ionized water for 1 minute.

Stage D: Palladinization of the seeded surface.—This stage, can of course, be carried out after stage B above.

The seeded Melinex sample is immersed for 5 minutes in a solution comprising:

| | | |
|---|---|---|
| Palladium chloride | g | 1 |
| Hydrochloric acid (conc.) | cc | 5 |
| Water, to make 1 litre. | | |

whereafter it is rinsed in running de-ionized water for 5 minutes.

Stage E: Chemical copper deposition.—The Melinex sample, seeded and palladinized as above, is immersed, for a time between 10 and 30 minutes according to the coating thickness desired, in an electroless copper-plating bath comprising 1 part of solution A, 1 part of solution B, and 6 parts of distilled water.

Solution A:

| | | |
|---|---|---|
| Copper sulphate ($CuSo_4 \cdot 6H_{20}$) | gms | 170 |
| Formaldehyde (37% HCHO) | cc | 189 |
| Water, to make 1 gallon. | | |

Solution B:

| | Gms. |
|---|---|
| Nickel chloride ($NiCl_2 \cdot 6H_{20}$) | 65–70 |
| Sodium hydroxide (NaOH) | 155–160 |
| Rochelle salts ($NaKC_4H_4O_6 \cdot 4H_2O$) | 700–705 |
| Sodium carbonate ($Na_2CO_3 \cdot H_2O$) | 70–75 |
| Water, to make 1 gallon. | |

whereafter it is rinsed in running de-ionized water for 5 minutes, and dried for 1 hour in an oven at 50° C.

EXAMPLE II

Preparation of a copper coating on the surface of Melinex, using trichloroacetic acid solvent Stage A: Cleaning of surface.—The sample of Melinex is cleaned by the process described in Example I, stage A.

Stage B: Preconditioning of Melinex surface.—The clean Melinex sample is immersed for from 20 to 30 minutes with continuous agitation and at room temperature in an etching and bonding solution comprising:

| | | |
|---|---|---|
| Trichloroacetic acid ($CCl_3 \cdot COOH$) | gms | 600 |
| Stannous chloride | gms | 30 |
| Hydrochloric acid | cc | 160 |
| Water, to make 1 litre. | | |

whereafter it is withdrawn and washed in running deionized water for 5 minutes.

The reaction time of this preconditioning can be decreased by raising the temperature.

Palladinization and copper deposition may subsequently be effected, as in Example I, stages D and E.

The following table is a comparison of the adhesivity of copper strips on Melinex prepared by different processes, and shows the range of value obtained for a number of sample of each sort.

1.—represents copper on a clean, normal surface.

2.—represents copper on a surface prepared to show a wetting effect.

3.—represents copper on a surface which has been chemically etched.

4.—represents copper deposited by a vacuum process.

5.—represents copper deposited on a surface treated according to the process of this invention.

| Surface | Adhesivity in grams/inch |
|---|---|
| 1 | [1] 0 |
| 2 | [1] 0 |
| 3 | 5–50 |
| 4 | 200–300 |
| 5 | 200–390 |

[1] Immeasurable.

What is claimed is:

1. A process for metallizing at least one surface of a polyester terephthalate article comprising:
   attacking said surface with a concentrated sulphuric acid solution having a tin salt dissolved therein whereby the surface is both made hydrophilic and sensitized with one step;
   successively rinsing the sensitized surface with concentrated sulphuric acid solutions of increasing dilution;
   rinsing the sensitized surface with water after the concentration of the last sulphuric acid rinsing solution has fallen below about 71 percent by volume sulphuric acid; and
   contacting the conditioned surface with a solution of a metal salt to cause the chemical deposition of the metal from said metal salt solution onto the said conditioned surface.

2. A process for metallizing at least one surface of a polyester terephthalate article comprising:
   attacking said surface with a concentrated sulphuric acid solution having a tin salt dissolved therein whereby the surface is both made hydrophilic and sensitized with one step;

successively rinsing the sensitized surface with concentrated sulphuric acid solutions of increasing dilution;
   rinsing the sensitized surface with water after the concentration of the last sulphuric acid rinsing solution has fallen below about 71 percent by volume sulphuric acid;
   contacting the condition surface with a solution containing palladium ions to cause the deposition of palladium onto the said conditioned surface; and
   contacting the surface having palladium thereon with a solution of a metal salt to cause the chemical deposition of the metal from said metal salt solution onto the surface.

References Cited

UNITED STATES PATENTS

| | | | |
|---|---|---|---|
| 1,941,438 | 12/1933 | Kiefer | 117—35 |
| 2,063,034 | 12/1936 | Freund | 117—35 X |
| 2,355,933 | 8/1944 | Weiss | 117—35 |
| 2,454,610 | 11/1948 | Narcus | 117—35 X |
| 3,107,177 | 10/1963 | Saunders et al. | 117—213 X |
| 3,142,581 | 7/1964 | Leland | 117—138.8 X |
| 3,212,918 | 10/1965 | Tsu et al. | 117—47 X |
| 3,245,826 | 4/1966 | Luce et al. | 117—160 X |
| 3,075,856 | 6/1963 | Lukes | 117—47 |

FOREIGN PATENTS

| | | |
|---|---|---|
| 539,621 | 9/1941 | Great Britain. |

RALPH S. KENDALL, *Primary Examiner.*

U.S. Cl. X.R.

117—54, 160, 212, 213